United States Patent Office 2,861,816
Patented Nov. 25, 1958

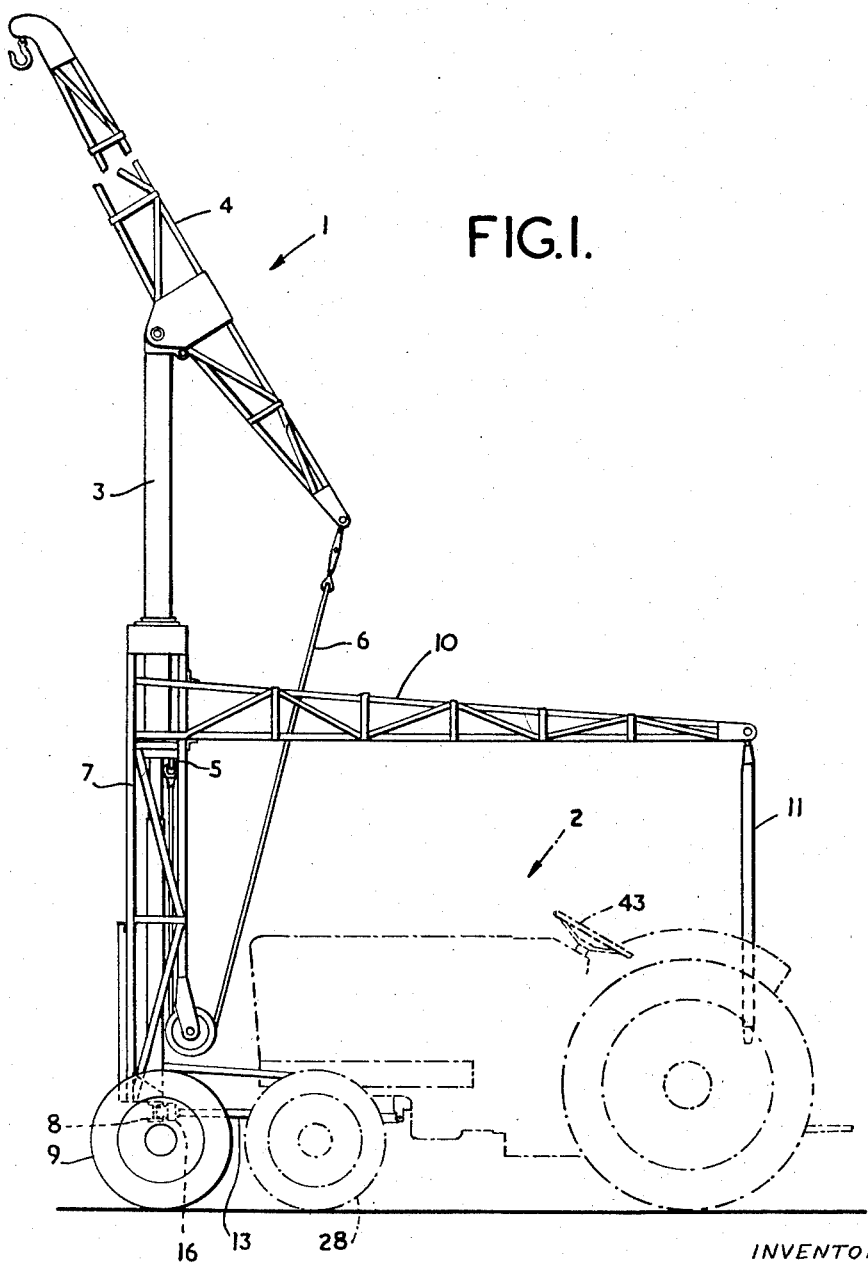

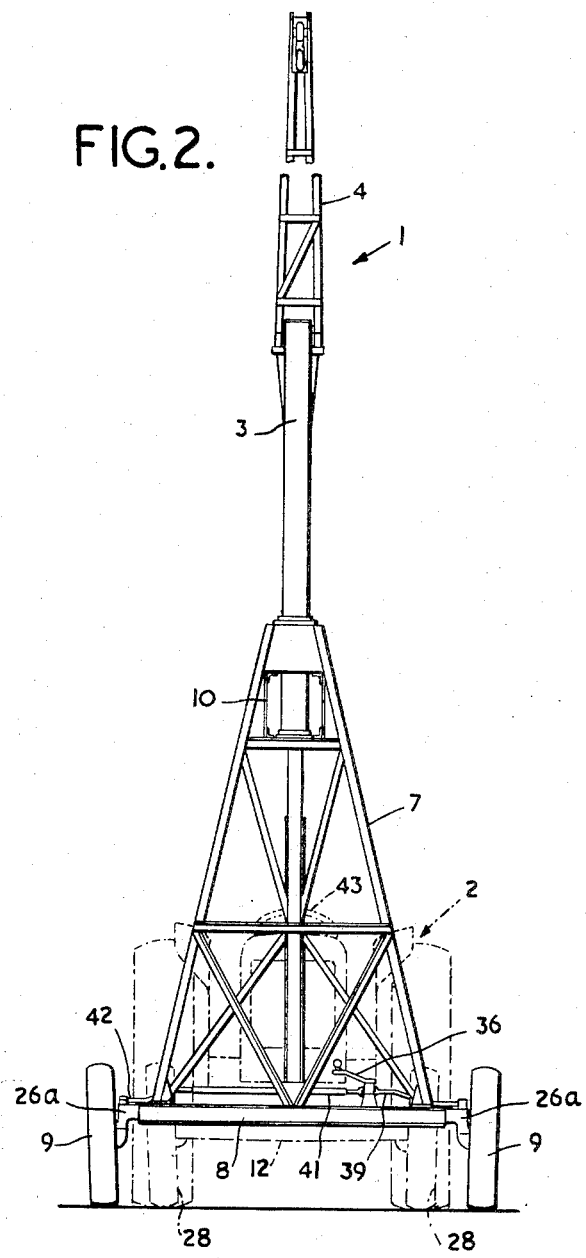

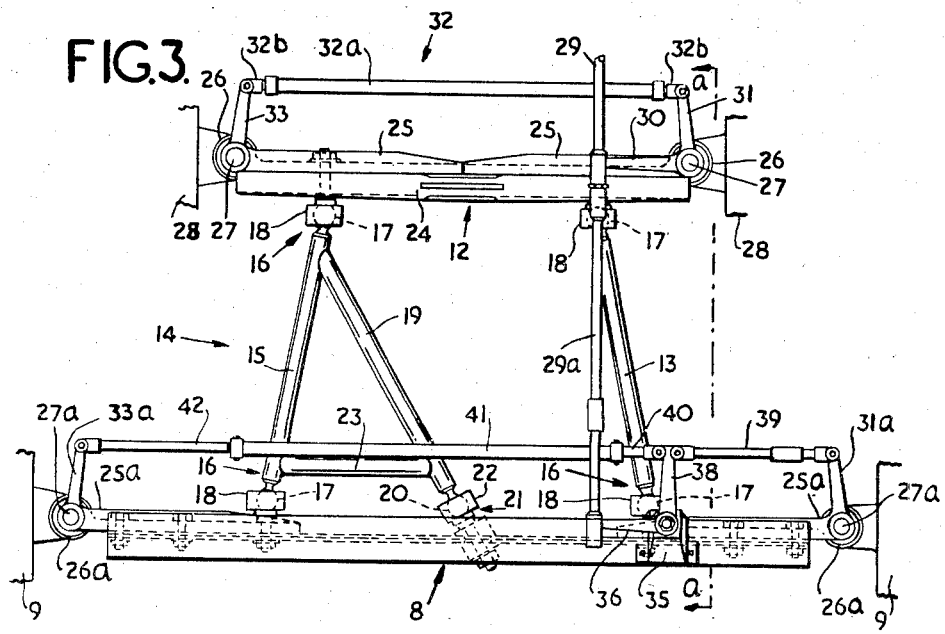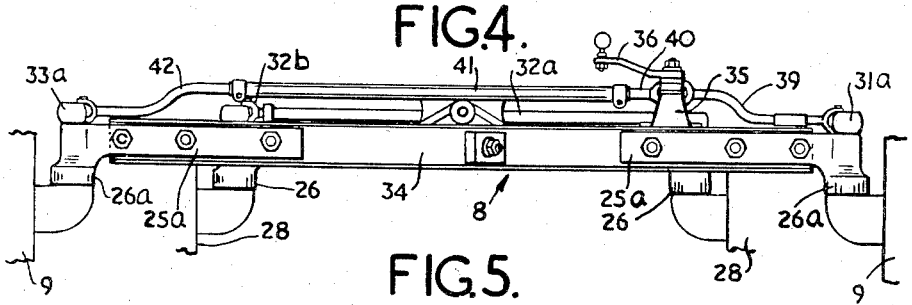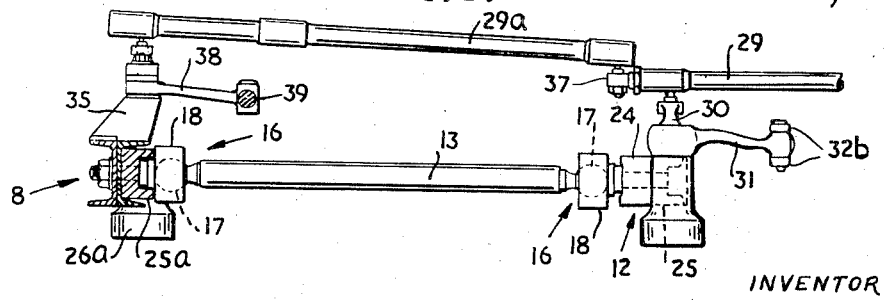

2,861,816

TRANSPORTABLE WHEELED APPLIANCES WITH INTERCONNECTED STEERING MEANS

Joseph Armstrong Whittall, Shatterford, near Bewdley, and Marshall F. Barnes, Birmingham, England Application August 24, 1956, Serial No. 605,971

Claims priority, application Great Britain August 25, 1955

3 Claims. (Cl. 280—419)

This invention has reference to transportable wheeled appliances, such as cranes and the like.

To enable appliances of this kind to be transported by a standard construction of tractor, it is customary to hitch the chassis of the appliances to a towing bar on the rear of the tractor so that the appliance is pulled when transported from one place to another. However, this known method of transportation suffers from the disadvantage that it is necessary for the driver of the tractor to turn in, or look rearwardly from, his seat in order to supervise the travel of the appliance. Whilst this procedure is itself inconvenient, a still greater inconvenience arises, when, again as is customary, the tractor driver is required to operate the appliance by controls located in the vicinity of his feet.

The principal object of the present invention is to overcome the above inconvenience by providing means whereby a wheeled crane or similar appliance may be hitched to the forward end of a standard tractor so that the appliance is adapted to be transported from place to place by a propulsive or pushing force, and to be steered by the tractor steering wheel.

A further object of the invention is to permit such relative movement between the steering axles of the tractor and the tractor-propelled appliance, that the ground wheels on the steering axle of the appliance are able to follow and travel over the contour of uneven ground independently of the ground wheels on the front axle of the tractor.

To enable these and other objects which will become apparent, to be realised, we position a wheeled appliance provided with at least one axle carrying steerable wheels forwardly of the steered wheels of a tractor, and we couple the said axle to the steered wheel carrying axle of the tractor by rods arranged to maintain the said axles at a substantially constant distance apart. To enable the complete vehicle assembly to be steered, we provide a further coupling to connect the steerable wheels of the tractor and of the appliance together, so that they may be moved in unison.

In order that the invention may be more readily understood and carried into practice, reference will now be made to the accompanying drawings, wherein:

Figure 1 is an elevation showing a crane and tractor combination.

Figure 2 is a front elevation of the combination shown in Figure 1.

Figure 3 is a plan, on an enlarged scale, of the crane axle and the steering-wheel-carrying axle of the tractor.

Figure 4 is a front elevation of Figure 3, and

Figure 5 is a section along the line a—a, Figure 3.

The appliances shown in Figures 1 and 2 of the said drawings consists of a crane 1 which is located in front of and is adapted to be propelled by a tractor 2. The crane is constructed as described in the complete specification of joint inventor Joseph A. Whittall's application for Letters Patent No. 567,410, dated February 23, 1956, and comprises a telescopic mast 3 and a jib 4 which is pivoted, at a position between its ends, upon the top of the mast, its one end being connected to an anchorage 5 on the mast by a rope or cable 6 so that as the mast is extended or contracted, the opposite end of the jib is raised or lowered; the tractor is of a known construction which is readily available for purchase on the open market.

The mast of the crane is mounted in a tower 7 of which the foot is carried upon an axle 8 having a steerable ground wheel 9 on each end thereof and, in the vicinity of its upper end, the said tower is provided with a cantilever beam 10 which extends at right angles therefrom rearwardly of and at a distance above the tractor; a rigid rod or tie bar 11 depends from the rear end of the beam and is coupled to the tire bar or other anchorage (not shown) on the back of the tractor so as to retain the crane in an upright position.

The axle 8 (see Figures 3–5) is attached to the front axle 12 of the tractor by an inherently rigid strut 13 and a triangular member 14 which comprises a strut 15, both the said struts being connected by their opposite ends to the axles 8 and 12 respectively through universal joints 16 of the ball and socket type, the ball 17 of each joint being integral with an end of the corresponding strut whereas the socket 18 is bolted to the axle 8 or 12 as the case may be.

The struts 13 and 15 diverge relatively to one another from the tractor axle to the crane axle and the triangular member includes a strut 19 which extends from the end of the strut 15 connected to the tractor axle and the side of the said strut 15 adjacent to the strut 13, its opposite end being formed with the ball 20 of another universal joint 21 of which the socket 22 is bolted to the crane axle. A strut 23, which serves as the base of the triangular member, extends between the struts 13 and 19 in the vicinity of the ends of the latter which are connected to the crane axle. The struts 13 and 15 maintain the axles in parallel relationship and the provision of the universal joints enables the axles to move relatively to one another, whereas relative inclination of the said struts and the triangular member ensure that the assembly is prevented from operating as a parallelogram linkage and the axles are maintained at a substantially constant distance apart.

The tractor axle is built up from a main bar 24 and two auxiliary bars 25 which are bolted to the main bar in alignment transversely of the tractor and are formed at their outer ends with bearing bosses 26 in each of which the king pin 27 of the corresponding steering road wheel 28 is journalled; the said wheels are controlled by steering mechanism which includes a drag link 29, a drag arm 30 forming part of a bell crank lever and being attached to the said link by its free end, the lever being fast upon the king pin in one of the bosses 26; the other arm of the said bell crank lever serves as a track link 31 which is pivoted to one end of a track rod 32 and a track link 33, is pivoted to the opposite end of the track rod. The track rod consists of a tube 32a and two rods 32b having telescopic engagement with and being clamped in the opposite ends of the said tube, the projecting ends of the rods being pivoted to the track links 31 and 33 respectively.

Similarly and in order that as many as possible of the standard components of the tractor axle and steering mechanism may be employed in constructing the appliance axle and steering mechanism, thereby minimising production costs, the axle 8 is built up from an H-section main bar 34 and two auxiliary bars 25a which are bolted to the main bar 34 and are identical to the bars 25 of the tractor axle and are formed with bearing bosses 26a in which the king pins 27a of the steering wheels 9 of the appliance are journalled.

A block 35 is secured upon the top of the main bar 34 and has a bell crank lever journalled thereon, the arm 36 of the said lever serving as the drag arm of the steering mechanism of the appliance and being attached by its free end to an auxiliary drag link 29a which, as shown most clearly in Figure 5, is connected to an ear 37 on the adjacent end of the drag link 29; hence, longitudinal displacement of the link 29 imparts longitudinal displacement to the link 29a and both drag arms 30, 36 are swung in the same directions about their respective axes. The free end of the other arm 38 of the bell crank lever journalled upon the block 35 is pivoted to and between two rods 39, 40 extending in opposite directions transversely of the appliance. The rod 39 is pivoted to the free end of a track link 31a which is fast upon the king pin of one of the wheels 9, whereas the rod 40 makes telescopic engagement with and is clamped in one end of a tube 41 which is identical to the tube 32a. An additional rod 42 makes telescopic engagement with and is clamped in the opposite end of the tube 41, its projecting end being pivoted to the free end of the other track link 33a of the steering mechanism of the appliance, the said link being fast upon the king pin 27a which is journalled in the boss of the other auxiliary bar 25a and is adapted to transmit movement to the second steering wheel 9. Since both drag arms 30 and 36 are actuated in unison by the drag links 29 and 29a respectively, it follows that the steering wheels of the appliance will also be swung in unison about the axes of their respective king pins and the tractor and appliance will be steered along common paths by a driver when occupying his seat (not shown) on the tractor and turning the hand wheel 43. Moreover, when so seated, the driver has a clear view of the appliance without having to turn in his seat, so that he is able to guide and control the operation of the appliance easily and without any bodily discomfort.

Other modes of applying the principle of our invention may be employed, changes being made in the details described, providing the features as set out in any of the following claims or the equivalent of such be employed.

What we claim is:

1. A tractor propelled wheeled appliance having an axle upon which steerable ground wheels are mounted, the said axle being coupled to the front and steerable wheel mounting axle of the tractor by at least three struts which are adapted to lie in a common plane but of which no two are parallel, two the struts being joined at one end adjacent the tractor axle and diverging towards the appliance axle, the divergent ends being independently coupled to the said appliance axle by universal joints, the joined end being coupled to the said tractor axle by a single universal joint, and each of the other struts being coupled at opposite ends to the respective axles by individual universal joints.

2. A tractor propelled wheeled appliance having an axle at the opposite ends of which steerable ground wheels are carried, the said wheels being coupled together by a track rod and the said axle being connected to the front axle of the tractor which also carries steerable ground wheels at opposite ends thereof and which wheels are also coupled together by a track rod, the connection between the two axles being by a first member which comprises a triangular strut two corners of which are coupled to one of the axles and the third corner of which is coupled to the other axle, and by a second member which comprises a rod coupled at its opposite ends to the respective axles, each of the couplings including a universal joint, the rod being adapted to lie in the same plane as the strut but being inclined to each of the sides of the strut, and the two track rods being coupled together for simultaneous steering movement.

3. An appliance as claimed in claim 2 wherein the tractor is adapted to be steered by a drag-link and drag arm which is connected to the tractor axle rod, and the said drag link is coupled by a drag link extension to a drag arm which is connected to the appliance axle track rod.

References Cited in the file of this patent

UNITED STATES PATENTS

| 2,612,385 | Piltz | Sept. 30, 1952 |
| 2,646,287 | Kytola | July 21, 1953 |
| 2,771,300 | Latzen | Nov. 20, 1956 |